US008578597B2

(12) United States Patent
Dobson, Jr. et al.

(10) Patent No.: US 8,578,597 B2

(45) Date of Patent: Nov. 12, 2013

(54) FEED MECHANISM FOR A TERMINAL CRIMPING MACHINE

(75) Inventors: Richard R. Dobson, Jr., Palmyra, PA (US); Glenn I. Hoffner, Halifax, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 311 days.

(21) Appl. No.: 12/861,379

(22) Filed: Aug. 23, 2010

(65) Prior Publication Data

US 2012/0042508 A1 Feb. 23, 2012

(51) Int. Cl.

*B23P 19/00* (2006.01)
*H01R 43/042* (2006.01)

(52) U.S. Cl.

USPC ................................ 29/753; 29/33 M; 29/748

(58) Field of Classification Search

USPC .............. 29/753, 33 M, 418, 419, 470, 564.4, 29/566.2, 742, 748, 863

See application file for complete search history.

(56) References Cited

U.S. PATENT DOCUMENTS

| | | | | |
|---|---|---|---|---|
| 6,601,290 | B2 * | 8/2003 | Stakem | 29/742 |
| 2002/0116814 | A1 | 8/2002 | Stakem | |

OTHER PUBLICATIONS

International Search Report, International Application No. PCT/US2011/001373 International Filing Date, Mar. 8, 2011.

* cited by examiner

*Primary Examiner* — Thiem Phan

(57) ABSTRACT

A feed mechanism is provided for a terminal crimping machine that crimps a terminal to a wire. The feed mechanism includes a feed finger configured to move along a feed stroke in a feed direction to feed the terminal into a crimping zone. The feed mechanism also includes a cam having a lift profile, and a push rod that includes a cam follower engaged with the cam. The cam follower travels along the lift profile of the cam, moving the push rod in a lift direction. The push rod is mechanically connected to the feed finger and is configured to move the feed finger along the feed stroke in the feed direction when the push rod moves in the lift direction. A biasing mechanism is operatively connected to the push rod to exert a biasing force on the push rod that biases the cam follower into engagement with the cam.

18 Claims, 5 Drawing Sheets

FEED MECHANISM FOR A TERMINAL CRIMPING MACHINE

BACKGROUND OF THE INVENTION

The subject matter described and/or illustrated herein relates generally to machines for crimping electrical terminals to electrical wires, and more particularly, to a feed mechanisms for terminal crimping machines.

Terminal crimping machines have been used in the connector industry to effect termination of a single electrical wire or one or more electrical wires of a cable. Known terminal crimping machines have an interchangeable tooling assembly called an applicator. The applicator may include a crimping zone having opposing crimping tools for crimping a terminal to one or more electrical wires. For example, the crimping zone of the applicator may include an anvil and an applicator ram that holds a crimping tool-head (sometimes referred to as a "wire crimper") that opposes the anvil. In operation, a combination of the terminal and the electrical wire(s) is positioned within the crimping zone. The applicator ram is then driven toward the anvil until the crimping tool-head engages the terminal. Compression of the terminal between the anvil and the crimping tool-head crimps the terminal to the wire(s).

Some known terminal crimping machines include a feed mechanism that feeds the terminals to the applicator. For example, the feed mechanism typically includes a feed finger that pushes the terminals into the crimping zone of the applicator. Various types of feed styles are used by the feed mechanisms of terminal crimping machines to drive movement of the feed finger, such as mechanical, air, and servo feed styles. Within mechanical feed styles, movement of the feed finger to push the terminals into the crimping zone is driven by the applicator ram of the applicator. Specifically, the feed mechanism includes a cam that is operatively connected to the applicator ram of the applicator. Movement of the applicator ram away from the anvil moves the cam into engagement with a cam follower of the feed mechanism. The cam follower is connected to the feed finger through linkage that moves the feed finger in a direction toward the crimping zone of the applicator as the cam moves away from the anvil with the applicator ram. Accordingly, as the applicator ram moves away from the anvil, engagement between the cam and the cam follower causes the feed finger to push a terminal into the crimping zone.

The amount of travel that the feed finger moves to push a terminal into the crimping zone is typically referred to as a "feed stroke". The feed stroke may be adjustable, for example to accommodate different terminals, different operating conditions, and/or the like. For some terminals and/or operating conditions, a relatively short feed stroke is desired. At least some known feed mechanisms achieve relatively short feed strokes by allowing the cam follower to lift off of the cam at one or more points during the feed stroke. Lifting the cam follower off of the cam indirectly shortens the cam lift, which results in a shorter feed stroke. For example, the cam follower may be initially spaced apart from the cam at the beginning of a feed stroke. As the cam moves further away from the anvil, the cam follower engages the cam at an advanced position along the lift profile of the cam. Accordingly, the cam follower travels along less of the lift profile of the cam, which results in less movement of the cam follower and therefore a shorter feed stroke of the feed finger. However, when the cam follower lifts off the cam during a feed stroke, an instantaneous and/or uncontrolled acceleration, or jerk, is translated to the feed finger, and therefore to the terminal, when the cam follower ultimately engages the lift profile of the cam. Such a jerk of the feed finger and terminal may negatively affect the repeatability and accuracy of feeding the terminal into the crimping zone of the applicator.

BRIEF DESCRIPTION OF THE INVENTION

In one embodiment, a feed mechanism is provided for a terminal crimping machine that crimps a terminal to a wire. The terminal crimping machine has a crimping zone. The feed mechanism includes a feed finger configured to move along a feed stroke. The feed finger is configured to move along the feed stroke in a feed direction to feed the terminal into the crimping zone. The feed mechanism also includes a cam having a lift profile, and a push rod that includes a cam follower engaged with the cam. The cam follower is configured to travel along the lift profile of the cam such that the push rod moves in a lift direction. The push rod is mechanically connected to the feed finger and is configured to move the feed finger along the feed stroke in the feed direction when the push rod moves in the lift direction. A biasing mechanism is operatively connected to the push rod to exert a biasing force on the push rod that biases the cam follower of the push rod into engagement with the cam.

In another embodiment, an applicator assembly is provided for a terminal crimping machine that crimps a terminal to a wire. The applicator assembly includes an applicator having a crimping zone, and a feed mechanism configured to be operatively connected to the applicator. The feed mechanism includes a feed finger configured to move along a feed stroke. The feed finger is configured to move along the feed stroke in a feed direction to feed the terminal into the crimping zone. The feed mechanism also includes a cam having a lift profile, and a push rod that includes a cam follower engaged with the cam. The cam follower is configured to travel along the lift profile of the cam to move the push rod in a lift direction. The push rod is mechanically connected to the feed finger and is configured to move the feed finger along the feed stroke in the feed direction when the push rod moves in the lift direction. A biasing mechanism is operatively connected to the push rod to exert a biasing force on the push rod that biases the cam follower of the push rod into engagement with the cam.

In another embodiment, a feed mechanism is provided for a terminal crimping machine that crimps a terminal to a wire. The terminal crimping machine has a crimping zone. The feed mechanism includes a feed finger configured to move along a feed stroke. The feed finger is configured to move along the feed stroke in a feed direction to feed the terminal into the crimping zone. The feed mechanism also includes a cam having a lift profile, and a push rod that includes a cam follower engaged with the cam. The cam follower is configured to travel along the lift profile of the cam such that the push rod moves in a lift direction. The push rod is mechanically connected to the feed finger and is configured to move the feed finger along the feed stroke in the feed direction when the push rod moves in the lift direction. A biasing mechanism is operatively connected to the push rod to exert a biasing force on the push rod that biases the cam follower of the push rod into constant engagement with the cam during an entirety of the feed stroke of the feed finger.

DETAILED DESCRIPTION OF THE INVENTION

Figure 1:
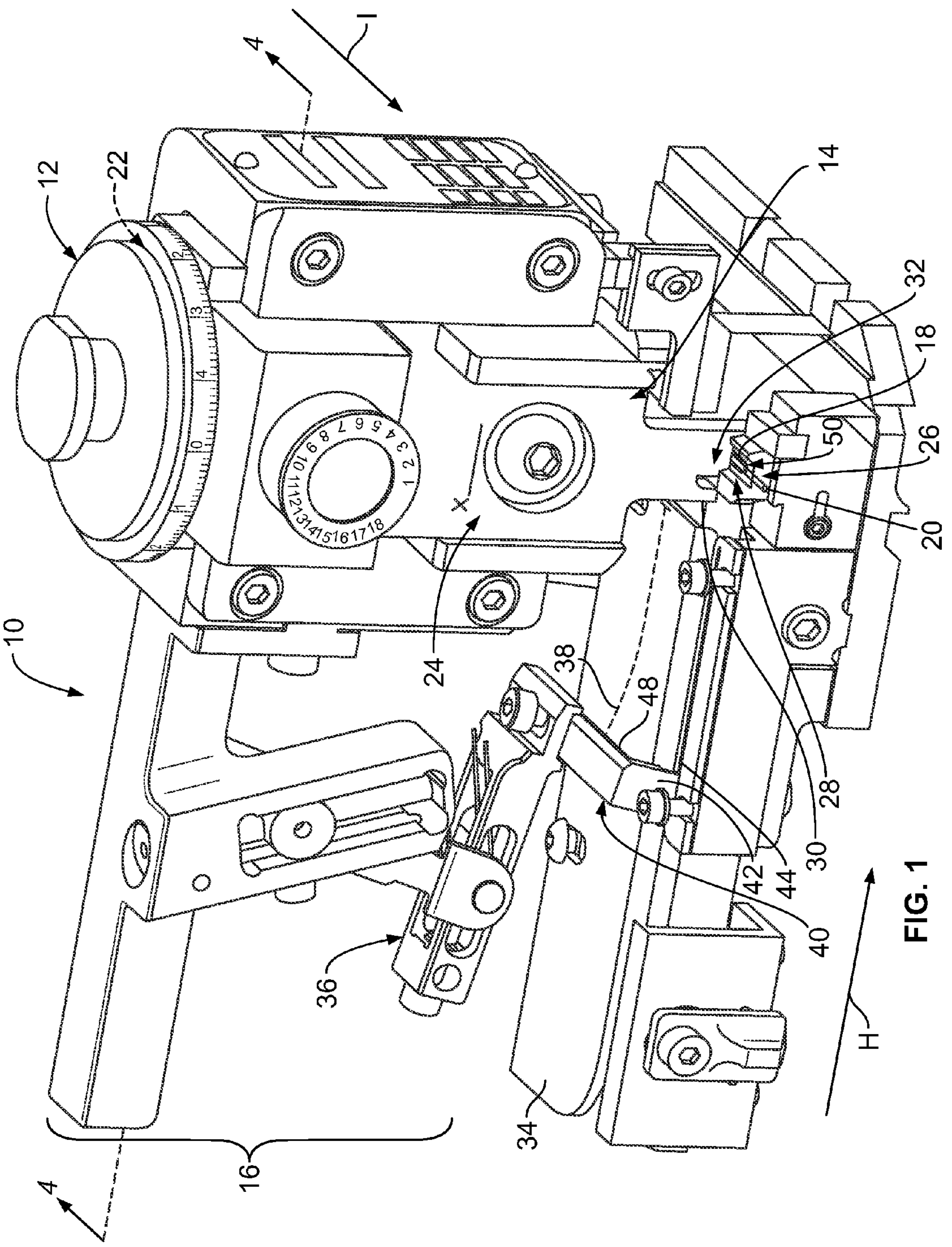
FIG. 1 is a perspective view of an exemplary embodiment of a terminal crimping machine.

FIG. 1 is a perspective view of an exemplary embodiment of a terminal crimping machine 10. The terminal crimping machine 10 includes a terminator 12, an applicator 14, and a feed mechanism 16. The terminal crimping machine 10 is used to crimp a terminal 18 to an electrical wire 20. The terminal crimping machine 10 will be described and illustrated herein with reference to crimping the terminal 18 to a single electrical wire 20. But, it should be understood that the terminal 18 may be crimped to a plurality of electrical wires 20, for example a plurality of electrical wires 20 of a single cable (not shown). A combination of the applicator 14 and the feed mechanism 16 may be referred to herein as an "applicator assembly".

The terminator 12 includes a terminator drive system 22 that drives an applicator ram 24 of the applicator 14. The applicator 14 also includes an anvil 26 opposite the applicator ram 24 for defining a crimping zone 28 of the terminal crimping machine 10. In the exemplary embodiment, the anvil 26 defines a bottom of the crimping zone 28. The applicator ram 24 includes an end 30 having a crimping tool-head 32 extending therefrom. The crimping too-head 32 is sometimes referred to as a "wire crimper". The anvil 26 and/or the crimping tool-head 32 may include a size and/or a shape that is complementary with the terminal 18 and/or the electrical wire 20. The anvil 26 and/or the crimping tool-head 32 may include a size and/or shape configured to form the terminal 18 and/or the electrical wire 20 into a predetermined crimped size and/or shape. The crimping tool-head 32 may be integrally formed with the applicator ram 24, or may be a discrete component that is mounted on the end 30 of the applicator ram 24.

In operation, a combination of the terminal 18 and the electrical wire 20 is positioned on the anvil 26. Specifically, the terminal 18 is positioned on the anvil 26 and the electrical wire 20 is fed into the crimping zone 28 such that the electrical wire 20 is positioned on and/or within the terminal 18. The terminator 12 drives the applicator ram 24 toward the anvil 26 until the combination of the terminal 18 and the electrical wire 20 is engaged between the crimping tool-head 32 and the anvil 26. As the applicator ram 24 is driven toward the anvil 26, compression of the terminal 18 about the electrical wire 20 crimps the terminal to the electrical wire 20.

As described above, the terminal crimping machine 10 includes a feed mechanism 16. The feed mechanism 16 feeds the terminal 18 into the crimping zone 28 of the applicator 14. For example, a line or strip (not shown) of a plurality of terminals 18 may be positioned on a platform 34 of the terminal crimping machine 10 adjacent the crimping zone 28. The feed mechanism 16 successively feeds each of the terminals 18 of the line or strip from the platform 34 and into the crimping zone 28 for crimping to the corresponding wire(s) 20. For clarity, only a single terminal 18 and electrical wire 20 is shown herein. The feed mechanism 16 includes a feed finger 36 that engages the terminals 18 and/or the line or strip of terminals 18 to feed the terminals 18 into the crimping zone 28. Specifically, the feed finger 36 moves along a feed stroke 38 from a retracted position to a fed position to push the terminals 18 into the crimping zone 28 of the applicator 14. The feed finger 36 is shown in the retracted position in FIG. 1. A tip member 40 of the feed finger 36 optionally includes a tab 42 that extends within an optional slot 44 of the terminal crimping machine 10 for guiding movement of the feed finger 36 along the feed stroke 38.

Figure 2:
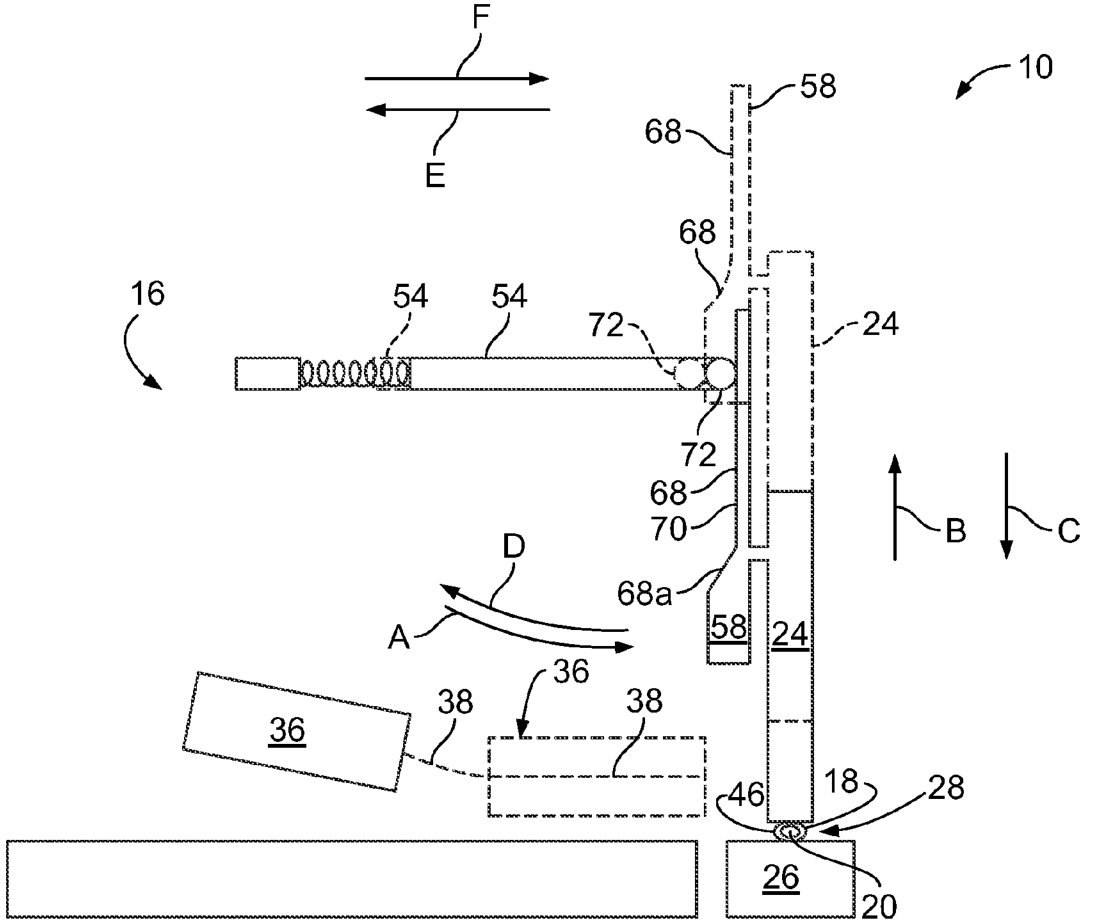
FIG. 2 is a schematic view of a portion of the terminal crimping machine shown in FIG. 1 illustrating an exemplary feed stroke of an exemplary embodiment of a feed mechanism of the terminal crimping machine.

FIG. 2 is a schematic view of a portion of the terminal crimping machine 10 illustrating an exemplary feed stroke 38 of the feed finger 36 of the feed mechanism 16. Both the retracted position and the fed position of the feed finger 36 are shown in FIG. 2, with the fed position being shown with phantom lines. Before an initial crimping operation and/or at the end of a previous crimping operation, the applicator ram 24 is in a finished crimp position relative to the anvil 26 and the feed finger 36 is in the retracted position. As the applicator ram 24 moves away from the finished crimped position (away from the anvil 26) in the direction of the arrow B, the feed finger 36 moves along the feed stroke 38 in a feed direction A from the retracted position to the fed position. As the feed finger 36 moves along the feed stroke 38 in the feed direction A, a tip member 40 (FIG. 1) of the feed finger 36 engages the terminal 18 and/or the line or strip of terminals 18 to push the terminal 18 into the crimping zone 28 adjacent the anvil 26. As the applicator ram 24 moves toward the anvil 26 in the direction of the arrow C to crimp the terminal 18 to the electrical wire 20, the feed finger 36 moves along the feed stroke 38 in a retract direction D (that is opposite the feed direction A) from the fed position to the retracted position.

Because the feed finger 36 moves along the feed stroke 38 in the feed direction A during movement of the applicator ram 24 in the direction of the arrow B away from the anvil 26, in the exemplary embodiment, the feed mechanism 16 operates in what is commonly referred to as a "post-feed style". Alternatively, the feed mechanism 16 may operate in what is commonly referred to as a "pre-feed style", wherein the feed finger 36 moves along the feed stroke 38 in the feed direction A during movement of the applicator ram 24 in the direction of the arrow C toward the anvil 26.

The feed stroke 38 of the feed finger 36 is adjustable between a range of predetermined amounts of travel. In other words, the length of the feed stroke 38 is adjustable such that the feed finger 36 may travel different amounts therealong between the retracted and fed positions. The feed stroke 38 may be adjusted to accommodate differently sized and/or shaped terminals 18 and/or wires 20, to accommodate different operating conditions, and/or the like. For example, some terminals 18 may require a shorter feed stroke than other terminals 18 to be properly positioned in the crimping zone 28 for accurate and repeatable crimping, and vice versa. The length and path of the feed strokes 38 and 238 (FIG. 3) shown herein are meant as exemplary only. Different terminals 18, different wires 20, different operating conditions, and/or the like may utilize a feed stroke 38 or 238 that has a greater amount of travel and/or a different path than is shown herein. The feed stroke 38 may be adjusted as described below to adjust the amount of travel of the feed finger 36 between the retracted and fed positions.

As shown in FIG. 1, in the exemplary embodiment, the feed mechanism 16 is what is commonly referred to as a "side feed" type, wherein the terminals 18 are arranged side-by-side within the line or strip thereof and the terminals 18 is fed into the crimping zone 28 generally in the direction of the arrow H in FIG. 1. In such a side feed type, the tip member 40 includes an engagement edge 48 that engages the sides 46 of the terminals 18, and/or engages the line or strip of terminals

Figure 3:
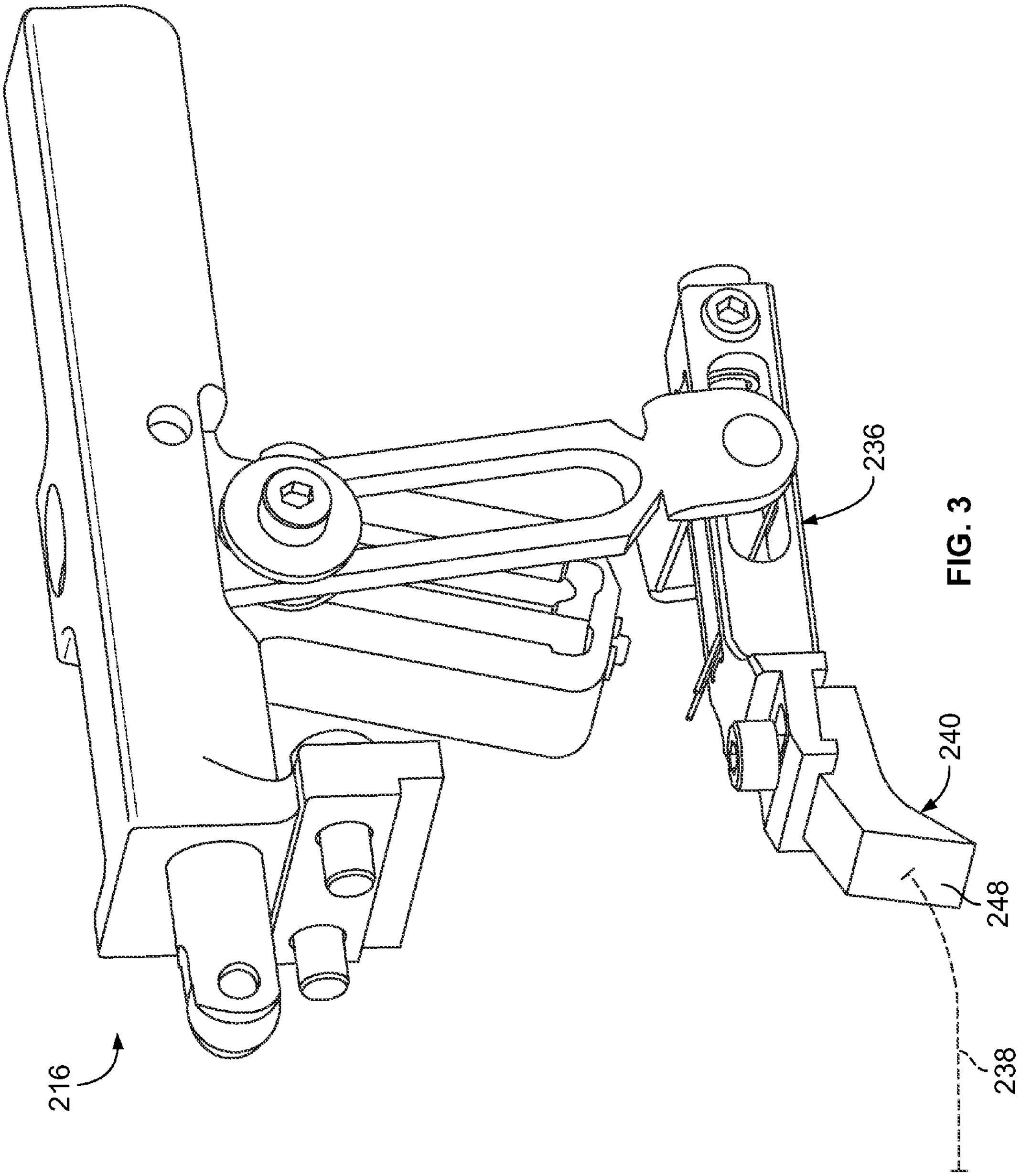
FIG. 3 is a perspective view of a portion of an exemplary alternative embodiment of a feed mechanism.
Figure 4:
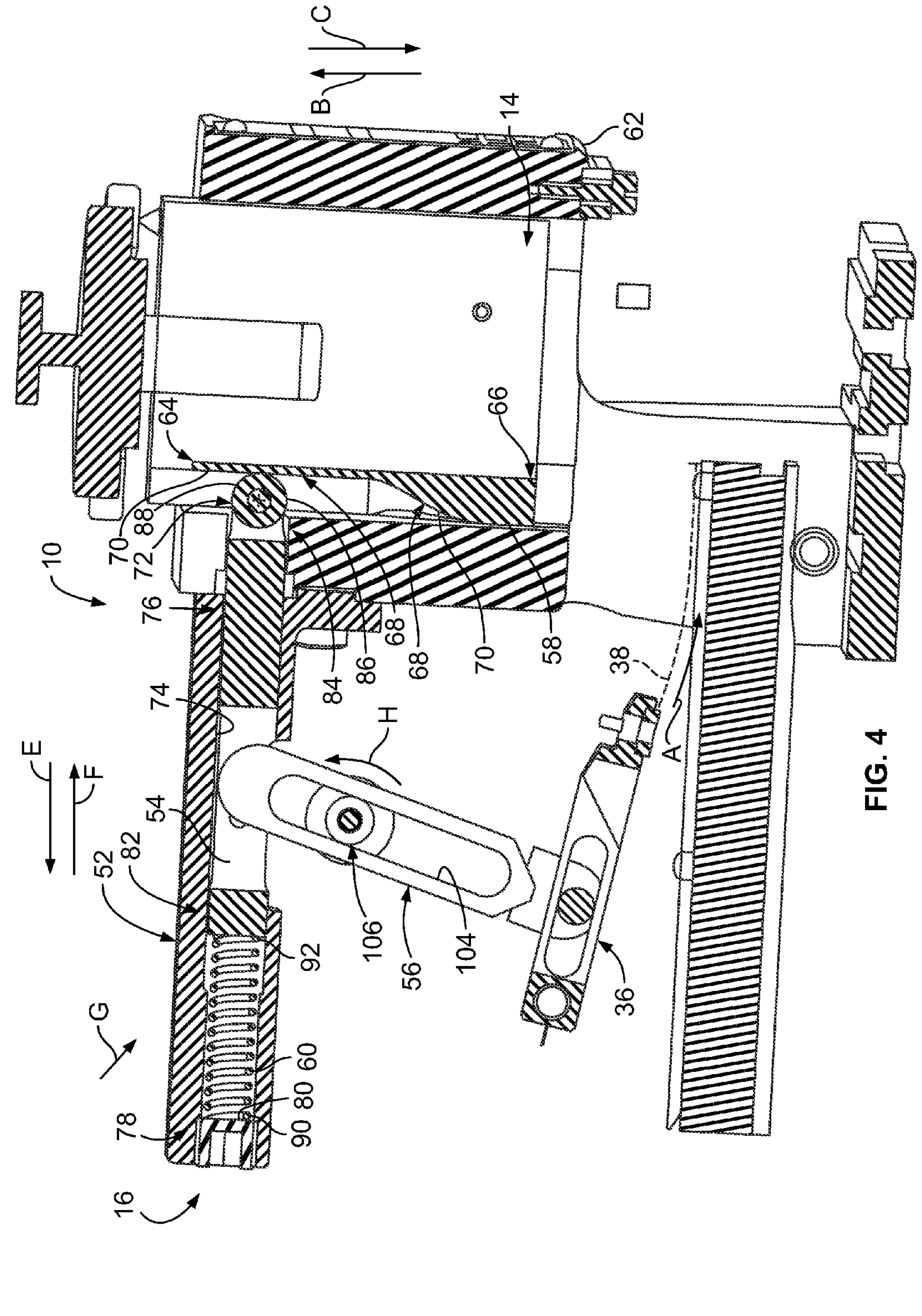
FIG. 4 is a cross-sectional view of the terminal crimping machine shown in FIGS. 1 and 2 taken along line 4-4 of FIG. 1.

18 at locations between the sides 46 of the terminals 18, to push the terminals 18 into the crimping zone 28. Alternatively, the feed mechanism 16 is what is commonly referred to as an "end feed" type, wherein the terminals 18 are arranged end-to-end within the line or strip thereof and the terminals 18 are fed into the crimping zone 28 generally in the direction of the arrow I in FIG. 1. In such an end feed type, the tip member 40 would engage ends 50 of the terminals 18, and/or would engage the line or strip of terminals 18 at locations between the ends 50 of the terminals 18, to push the terminals 18 into the crimping zone 28. For example, FIG. 3 is a perspective view of a portion of an exemplary alternative embodiment of a feed mechanism 216. The feed mechanism 216 includes a feed finger 236 that moves along a feed stroke 238 from a retracted position to a fed position to feed the terminals 18 (FIGS. 1 and 2) into the crimping zone 28 (FIGS. 1 and 2) of the applicator 14 (FIGS. 1 and 4). The feed finger 236 is shown in the retracted position in FIG. 3. The feed finger 236 includes a tip member 240 having an engagement surface 248. The engagement surface 248 engages the ends 50 (FIG. 1) of the terminals 18, and/or engages the line or strip of terminals 18 at locations between the ends 50 of the terminals 18, to push the terminals 18 into the crimping zone 28. It should be appreciated that the feed mechanism 216 would be mounted to the applicator 14 (FIGS. 1 and 4) and/or another component of the terminal crimping machine 10 (FIGS. 1, 2, and 4) in an orientation (e.g., approximately 90° relative to the orientation of the feed mechanism 16 (FIGS. 1, 2, 4, and 5)) that would enable the feed mechanism 216 to feed the terminals into the crimping zone 28 generally in the direction of the arrow I in FIG. 1. The orientation of other components (e.g., the platform 34) of the terminal crimping machine 10 may also be changed to accommodate the end feed type.

FIG. 4 is a cross-sectional view of the terminal crimping machine 10 taken along line 4-4 of FIG. 1 and illustrating the feed mechanism 16. The feed mechanism 16 includes a housing 52, a push rod 54, a link 56, a cam 58, a biasing mechanism 60, and the feed finger 36. In the exemplary embodiment, the housing 52 is mounted to a housing 62 of the applicator 14. In addition or alternatively, the housing 52 of the feed mechanism 16 is mounted to another component of the terminal crimping machine 10. The feed mechanism 16 is detachable from the applicator 14. In other words, the feed mechanism 16 can be operatively disconnected and removed from the applicator 14. The feed mechanism 16 is interchangeable such that the feed mechanism 16 can be detached from the applicator 14 and replaced with a different feed mechanism, whether or not the different feed mechanism is of the same feed style (e.g., mechanical, air, servo, pre-feed, or post-feed) and whether or not the different feed mechanism is of the same feed type (e.g., end feed or side feed).

The cam 58 is attached to and/or held within the housing 62 of the applicator 14 and is configured to move within the housing 62, and relative to the push rod 54, in the opposite directions B and C. The cam 58 extends a length from an end 64 to an opposite end 66. The cam 58 includes a lift profile 68 that extends along the length of the cam 58 from the end 64 to the end 66. More particularly, the lift profile 68 of the cam 58 is defined by a surface 70 of the cam 58 that extends from the end 64 to the end 66. As will be described below, as the cam 58 moves in the direction B, a cam follower 72 of the push rod 54 engages the surface 70 of the cam 58 and travels along the lift profile 68 to actuate movement of the feed finger 36 from the retracted position to the fed position. The direction B of the movement of the cam 58 may be referred to herein as a "cam direction".

In the exemplary embodiment, and referring again to FIG. 2, the cam 58 is operatively connected to the applicator ram 24 of the applicator 14 for movement therewith. Specifically, movement of the applicator ram 24 drives movement of the cam 58. The cam 58 is operatively connected to the applicator ram 24 such that when the applicator ram 24 moves in the direction B away from the anvil 26, the cam 58 also moves in the direction B. Similarly, the cam 58 moves along with the applicator ram 24 in the direction of the arrow C. The cam 58 may be operatively connected to the applicator ram 24 for movement therewith using any structure, connection type, means, and/or the like. In the exemplary embodiment, the cam 58 is mechanically connected directly to the applicator ram 24 for movement therewith, such that the cam 58 moves the same amount as the applicator ram 24 in the directions B and C. In addition or alternatively, the cam 58 is mechanically connected to the applicator ram 24 for movement therewith using a gear, pulley, and/or sprocket system, wherein the cam 58 may move the same or a different amount in the direction B and C than the applicator ram 24.

Referring again to FIG. 4, the housing 52 of the feed mechanism 16 includes an interior cavity 74 within which the push rod 54 extends. The interior cavity 74 extends from an open end 76 to an opposite closed end 78. The closed end 78 is defined by an end wall 80 of the housing 52. The push rod 54 extends a length from an end 82 to an opposite end 84. The push rod 54 is held within the interior cavity 74 of the housing 52 such that the end 82 faces the closed end 78 of the housing 52. The push rod 54 extends outwardly through the open end 76 of the housing 52 such that the end 84 of the push rod 54 extends outside the interior cavity 74 of the housing 52. The end 82 of the push rod 54 may be referred to herein as a "first end", while the end 84 may be referred to herein as a "second end".

The push rod 54 includes the cam follower 72. In the exemplary embodiment, the cam follower 72 is located at the second end 84 of the push rod 54. Alternatively, the cam follower 72 may be located at another location along the length of the push rod 54 than the second end 84. The push rod 54 is movable within the interior cavity 74 of the housing 52 in opposite directions E and F. As will be described below, movement of the push rod 54 in the direction E is driven by engagement of the cam follower 72 with the lift profile 68 of the cam 58 as the cam 58 moves in the direction B relative to the push rod 54. Movement of the push rod 54 in the direction F is driven by the biasing mechanism 60, as will also be described below. The direction E of the movement of the push rod 54 may be referred to herein as a "lift direction".

In the exemplary embodiment, the directions E and F of movement of the push rod 54 are shown herein as extending approximately perpendicular to the directions B and C of movement of the cam 58. But, the directions E and F may alternatively extend at any other angle relative to the directions B and C that enables the cam 58 and push rod 54 to move the feed finger 36 as described and/or illustrated herein.

The exemplary embodiment of the cam follower 72 includes a roller 86 that is rotatably mounted on the push rod 54. In other words, the roller 86 is configured to rotate about an axis of rotation 88 relative to the push rod 54. As the cam follower 72 travels along the lift profile 68 of the cam 58, the roller 86 engages and rolls along the surface 70 of the cam 58 by rotating about the axis of rotation 88. The roller 86 may facilitate smoother travel of the cam follower 72 along the lift profile 68 of the cam 58. In an alternative embodiment, the cam follower 72 does not include the roller 86, but rather slides along the surface 70 that defines the lift profile 68 of the cam 58.

The biasing mechanism 60 is operatively connected to the push rod 54 to exert a biasing force on the push rod 54 that biases the cam follower 72 of the push rod 54 into engagement with the cam 58. The biasing force exerted by the biasing mechanism 60 biases the push rod 54 in the direction F. As will be described below, the biasing force exerted by the biasing mechanism 60 on the push rod 54 causes the cam follower 72 to remain engaged with the cam 58 during an entirety of the feed stroke 38 of the feed finger 36. In other words, the cam follower 72 is constantly engaged with the cam 58 during the entirety of the feed stroke 38 of the feed finger 36. The direction F may be referred to herein as a "bias direction".

The biasing mechanism 60, and/or any intervening structures (not shown) thereof, may engage any portion of the push rod 54 and any other structure of the terminal crimping machine 10 that enables the biasing mechanism 60 to exert the biasing force described and/or illustrated herein. In the exemplary embodiment, the biasing mechanism 60 is received within the interior cavity 74 of the housing 52 between the push rod 54 and the end wall 80 of the housing 52 such that the biasing mechanism 60 is operatively connected between the housing 52 and the push rod 54. Specifically, the biasing mechanism 60 includes an end 90 that engages the end wall 80 of the housing 52, and an opposite end 92 that engages the first end 82 of the push rod 54. The biasing mechanism 60 is therefore engaged between the end wall 80 of the housing 52 and the first end 82 of the push rod 54. Engagement of the biasing mechanism 60 between the end wall 80 and the end 82 enables the biasing mechanism 60 to exert the biasing force on the push rod 54 that biases the push rod 54 in the direction F.

In the exemplary embodiment, because the biasing mechanism 60 is a coil spring that has a length arranged approximately parallel the direction F, the biasing force exerted by the biasing mechanism 60 acts in the direction F to bias the push rod 54 in the direction F. Alternatively, the biasing force may act in any other direction that enables the biasing force to bias the push rod 54 in the direction F. For example, the biasing force may alternatively act in a direction G that is non-parallel with the direction F. The biasing force exerted by the biasing mechanism 60 may be selected to provide any predetermined amount of bias to the push rod 54, whether or not the biasing force is linear relative to an amount of deflection of the biasing mechanism 60. The exemplary embodiment of the biasing mechanism 60 is a coil spring. But, in addition or alternatively to the coil spring, the biasing mechanism 60 may include any other type of biasing mechanism that enables the biasing mechanism 60 to function as described and/or illustrated herein, such as, but not limited to, a leaf spring (not shown), a damper (not shown), and/or the like. Although only one biasing mechanism 60 is shown, the feed mechanism 16 may include any number of biasing mechanisms 60.

Figure 5:
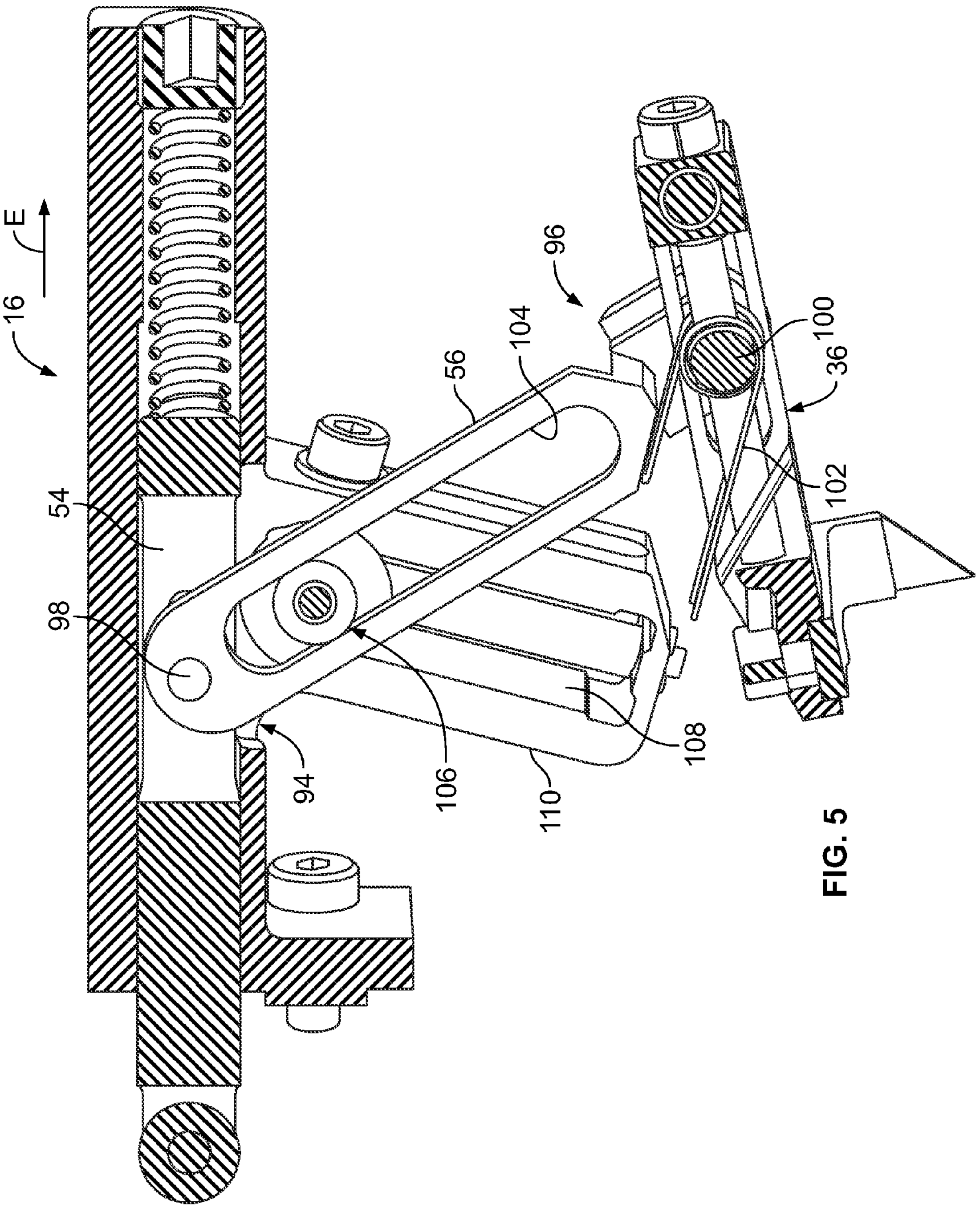
FIG. 5 is a cross-sectional view of the feed mechanism shown in FIG. 2.

FIG. 5 is a cross-sectional view of the feed mechanism 16. The push rod 54 is mechanically connected to the feed finger 36 via the link 56. The mechanical connection provided by the link 56 configures the push rod 54 to move the feed finger 36 along the feed stroke 38 (FIGS. 1, 2, and 4) in the feed direction A (FIGS. 2 and 4) when the push rod 54 moves in the direction E. The link 56 extends a length from an end 94 to an opposite end 96. The link 56 is connected to the push rod 54 at the end 94. A bearing 98 and/or the like is provided at the connection between the link 56 and the push rod 54 to enable the link 56 to pivot about the bearing 98 relative to the push rod 54. The opposite end 96 of the link 56 is connected to the feed finger 36. The connection between the link 56 and the feed finger 36 is also provided with a bearing 100 and/or the like to enable the link 56 to pivot about the bearing 100 relative to the feed finger 36. An optional biasing mechanism 102 is operatively connected between the feed finger 36 and the link 56 to bias the feed finger 36 to a predetermined pivot position relative to the link 56. The link 56 includes a slot 104 that extends through the link 56 along at least a portion of the length of the link 56. A pivot pin 106 extends through a slot 104. The pivot pin 106 also extends through a slot 108 within an arm 110 of the housing 52.

Referring again to FIG. 4, the link 56 pivots about the pivot pin 106 during a feed stroke 38 of the feed finger 36 to transfer motion of the push rod 54 to motion of the feed finger 36. Specifically, the link 56 pivots about the pivot pin 106 in a pivot direction H in response to movement of the push rod 54 in the direction E. Pivoting of the link 56 in the pivot direction H moves the feed finger 36 along the feed stroke 38 in the feed direction A from the retracted position to the fed position. As described above, the feed stroke 38 of the feed finger 36 is adjustable between a range of predetermined amounts of travel between the retracted and fed positions. The amount of travel of the feed stoke 38 is adjusted by moving the location of the pivot pin 106 within the slot 104 of the link 56 and within the slot 108 (FIG. 5) of the housing arm 110 (FIG. 5). Changing the location of the pivot pin 106 within the slots 104 and 108 changes the location (relative to the push rod 54 and the feed finger 36) of the pivot point about which the link 56 pivots. Moving the pivot pin 106 within the slots 104 and 108 toward the push rod 54 lengthens the amount of travel of the feed stroke 38, while moving the pivot pin 106 within the slots 104 and 108 toward the feed finger 36 shortens the amount of travel of the feed stroke 38.

In operation, and referring now to FIG. 2, before an initial crimping operation and/or at the end of a previous crimping operation, the applicator ram 24 (not shown in FIG. 4) is in a finished crimp position relative to the anvil 26 and the feed finger 36 is in the retracted position. When the applicator ram 24 is in the finished crimp position, the cam follower 72 of the push rod 54 is engaged with the lift profile 68 of the cam 58 via the biasing force that biases the push rod 54 in the direction F. As the applicator ram 24 moves away from the finished crimped position in the direction B, the cam 58 moves along with the applicator ram 24 in the direction B. As the cam 58 moves in the direction B, the cam follower 72 of the push rod 54 travels along, in engagement with, the lift profile 68 of the cam 58. As the cam follower 72 travels along the lift profile 68, engagement between the cam follower 72 and a lift segment 68*a* of the lift profile 68 moves the push rod 54, against the biasing force of the biasing mechanism 60, in the direction E. As described above, via the link 56, movement of the push rod 54 in the direction E moves the feed finger 36 along the feed stroke 38 in the feed direction A from the retracted position to the fed position. The feed finger 36 thereby feeds the next terminal 18 into the crimping zone 28. The applicator ram 24 the moves in the direction C to crimp the terminal 18. The cam 58 moves along with the applicator ram 24 in the direction C, which causes the cam follower 72 of the push rod 54 to travel along, in engagement therewith, the lift profile 68 of the cam 58. Once the cam 58 has moved enough in the direction C such that the cam follower 72 clears the lift segment 68*a*, the biasing force exerted on the push rod 54 by the biasing mechanism 60 moves the push rod 54 in the direction F, which causes the feed finger 36 to move along the feed stroke 38 in the retract direction D from the fed position to the retracted position.

Regardless of the amount of travel selected for the feed stroke 38, the biasing force exerted by the biasing mechanism

60 on the push rod 54 biases the cam follower 72 into engagement with the cam 58 such that the cam follower 72 remains engaged with the cam 58 during an entirety of the feed stroke 38 of the feed finger 36. In other words, during the feed stroke 38 of the feed finger 36, the cam follower 72 travels along, in engagement with, an entirety of the lift segment 68*a* of the lift profile 68 of the cam 58. Stated in yet another way, the biasing force exerted by the biasing mechanism 60 on the push rod 54 biases the cam follower 72 into constant engagement with the cam 58 during the entirety of the feed stroke 38 of the feed finger 36. Accordingly, the cam follower 72 does not lift off of the cam 58 during the feed stroke 38 of the feed finger 36. More particularly, as can be seen in FIG. 2, the cam follower 72 remains engaged with the surface 70 of the cam 58 that defines the lift profile 68 during an entirety of the movement of the cam 58 in the direction B. Accordingly, the cam follower 72 remains engaged with the surface 70 of the cam 58 during an entirety of the movement of the feed finger 36 from the retracted position to the fed position. The cam follower 72 also remains engaged with the surface 70 of the cam 58 during an entirety of the movement of the cam 58 in the direction C. The cam follower 72 thereby remains engaged with the surface 70 of the cam 58 during an entirety of the movement of the feed finger 36 from the fed position to the retracted position. By remaining engaged with the cam 58 during movement of the feed finger 36 from the retracted to the fed position, the feed mechanism avoids translating an instantaneous and/or uncontrolled acceleration to the feed finger 36 when the cam follower 72 engages the lift segment 68*a* of the lift profile 68 of the cam 58.

As described above, in the exemplary embodiment, the feed mechanism 16 operates in the post-feed style. It should be appreciated that in alternative embodiments wherein the feed mechanism 16 operates in the pre-feed style, the orientation of the cam 58 as shown in the Figures will be reversed 180°. In other words, in embodiments wherein the feed mechanism 16 operates in the pre-feed style, the lift segment 68*a* of the cam 58 will be located closer to the end 64 of the cam 58 instead of closer to the end 66 of the cam 58.

The embodiments described and/or illustrated herein provide a feed mechanism that may feed terminals into a crimping zone of a terminal crimping machine more accurately and/or more repeatably than at least some known feed mechanisms. The embodiments described and/or illustrated herein may provide a feed mechanism having a cam follower that remains engaged with a cam during an entirety of a feed stroke of a feed finger of the feed mechanism. The embodiments described and/or illustrated herein may provide a feed mechanism having a cam follower 72 that does not off a cam of the feed mechanism during a feed stroke of a feed finger of the feed mechanism.

Exemplary embodiments are described and/or illustrated herein in detail. The embodiments are not limited to the specific embodiments described herein, but rather, components and/or steps of each embodiment may be utilized independently and separately from other components and/or steps described herein. Each component, and/or each step of one embodiment, can also be used in combination with other components and/or steps of other embodiments. When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc. Moreover, the terms "first," "second," and "third," etc. in the claims are used merely as labels, and are not intended to impose numerical requirements on their objects. Dimensions, types of materials, orientations of the various components, and the number and positions of the various components described and/or illustrated herein are intended to define parameters of certain embodiments, and are by no means limiting and are merely exemplary embodiments. Many other embodiments and modifications within the spirit and scope of the claims will be apparent to those of skill in the art upon reviewing the description and illustrations. The scope of the subject matter described and/or illustrated herein should therefore be determined with reference to the appended claims, along with the full scope of equivalents to which such claims are entitled. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

While the subject matter described and/or illustrated herein has been described in terms of various specific embodiments, those skilled in the art will recognize that the subject matter described and/or illustrated herein can be practiced with modification within the spirit and scope of the claims.

What is claimed is:

1. A feed mechanism for a terminal crimping machine that crimps a terminal to a wire, the terminal crimping machine having a crimping zone, said feed mechanism comprising:

a feed finger configured to move along a feed stroke, the feed finger being configured to move along the feed stroke in a feed direction to feed the terminal into the crimping zone and a retract direction;

a cam having a lift profile, the lift profile of the cam comprising a surface that extends along an entire length of the cam;

a push rod comprising a cam follower engaged with the cam, the cam follower being configured to travel along the lift profile of the cam such that the push rod moves in a lift direction, the push rod being mechanically connected to the feed finger and being configured to move the feed finger along the feed stroke in the feed direction when the push rod moves in the lift direction; and a biasing mechanism operatively connected to the push rod to exert a biasing force on the push rod that biases the cam follower of the push rod into engagement with the cam such that the cam follower remains engaged with the cam during an entirety of the feed stroke of the feed finger, wherein the cam follower remains engaged with the surface of the lift profile during an entirety of the movement of the cam both in a direction away from the crimping zone and in a direction towards the crimping zone.

2. The feed mechanism according to claim 1, wherein the feed stroke of the feed finger is the amount of travel that the feed finger moves in the feed direction from a retracted position to a fed position and the amount of travel that the feed finger moves in the retract direction from the fed position to the retracted position.

3. The feed mechanism according to claim 1, wherein the biasing force exerted by the biasing mechanism on the push rod biases the cam follower of the push rod into engagement with the cam such that the cam follower travels along, in engagement with, an entirety of a lift segment of the lift profile of the cam during the feed stroke of the feed finger.

4. The feed mechanism according to claim 1, wherein the biasing force of the biasing mechanism biases the push rod in a bias direction that is opposite the lift direction of the push rod.

5. The feed mechanism according to claim 1, wherein the biasing mechanism comprises at least one of a spring, a damper, a coil spring, or a leaf spring.

6. The feed mechanism according to claim 1, further comprising a housing, the push rod being held within the housing and extending a length from a first end to an opposite second end, the second end comprising the cam follower, the biasing mechanism extending between a wall of the housing and the first end of the push rod for exerting the biasing force on the push rod.

7. The feed mechanism according to claim 1, wherein the cam follower comprises a roller that is rotatably mounted on the push rod.

8. The feed mechanism according to claim 1, wherein the push rod is mechanically connected to the feed finger via a link, the link comprising a slot and a pivot pin extending within the slot, the link being configured to pivot about the pivot pin in response to movement of the push rod, wherein the position of the pivot pin is adjustable along the length of the slot for adjusting the feed stroke of the feed finger.

9. The feed mechanism according to claim 1, wherein the cam moves relative to the push rod in a cam direction to cause the cam follower to travel along the lift profile of the cam, the cam direction extending approximately perpendicular to the lift direction of the push rod.

10. The feed mechanism according to claim 1, wherein the feed stroke of the feed finger is adjustable between a range of predetermined amounts of travel, and wherein for each predetermined amount of travel, the biasing force exerted by the biasing mechanism on the push rod biases the cam follower of the push rod into engagement with the cam such that the cam follower remains engaged with the cam during the entirety of the feed stroke.

11. The feed mechanism according to claim 1, wherein the cam moves relative to the push rod to cause the cam follower to travel along the lift profile of the cam, the cam being configured to be operatively connected to an applicator ram of the terminal crimping machine such that movement of the applicator ram drives movement of the cam.

12. The feed mechanism according to claim 1, wherein the cam follower remains engaged with the cam during an entirety of a crimping operation, the crimping operation including movement of the feed finger along the feed stroke in the feed direction to a fed position and movement of the feed finger along the feed stroke in the retract direction to a retracted position.

13. The feed mechanism according to claim 1, wherein the cam follower remains engaged with the cam during an entirety of the movement of the feed finger along the feed stroke in the feed direction from a retracted position to a fed position and during an entirety of the movement of the feed finger along the feed stroke in the retract direction from the fed position to the retracted position.

14. The feed mechanism according to claim 1, wherein the retract direction is opposite the feed direction.

15. An applicator assembly for a terminal crimping machine that crimps a terminal to a wire, said applicator assembly comprising:

- an applicator having a crimping zone; and
- a feed mechanism configured to be operatively connected to the applicator, said feed mechanism comprising:
- a feed finger configured to move along a feed stroke, the feed finger being configured to move along the feed stroke in a feed direction to feed the terminal into the crimping zone and a retract direction;
- a cam having a lift profile, the lift profile of the cam comprising a surface that extends along an entire length of the cam;
- a push rod comprising a cam follower engaged with the cam, the cam follower being configured to travel along the lift profile of the cam to move the push rod in a lift direction, the push rod being mechanically connected to the feed finger and being configured to move the feed finger along the feed stroke in the feed direction when the push rod moves in the lift direction; and
- a biasing mechanism operatively connected to the push rod to exert a biasing force on the push rod that biases the earn follower of the push rod into engagement with the cam such that the cam follower remains engaged with the cam during an entirety of the feed stroke of the feed finger, wherein the cam follower remains engaged with the surface of the lift profile during an entirety of the movement of the cam both in a direction away from the crimping zone and in a direction towards the crimping zone.

16. The applicator assembly according to claim 15, wherein the biasing force exerted by the biasing mechanism on the push rod biases the cam follower of the push rod into engagement with the cam such that the cam follower travels along, in engagement with, an entirety of a lift segment of the lift profile of the cam during the feed stroke of the feed finger.

17. The applicator assembly according to claim 15, wherein the biasing force of the biasing mechanism biases the push rod in a bias direction that is opposite the lift direction of the push rod.

18. The applicator assembly according to claim 15, wherein the applicator comprises an applicator ram that is configured to hold one or more crimping tools, the cam moving relative to the push rod to cause the cam follower to travel along the lift profile of the cam, the cam being operatively connected to the applicator ram such that movement of the applicator ram drives movement of the cam.

* * * * *